Feb. 7, 1933. F. J. BECHERT 1,896,878
SPRING END CONNECTION
Filed Nov. 3, 1928
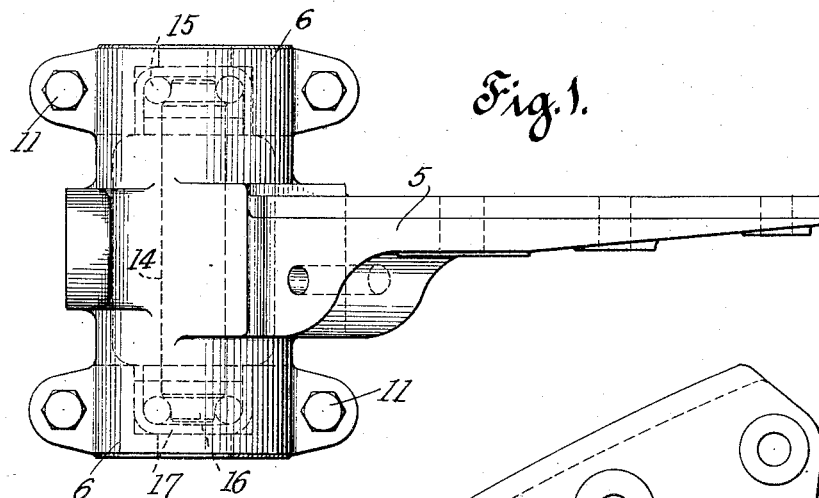
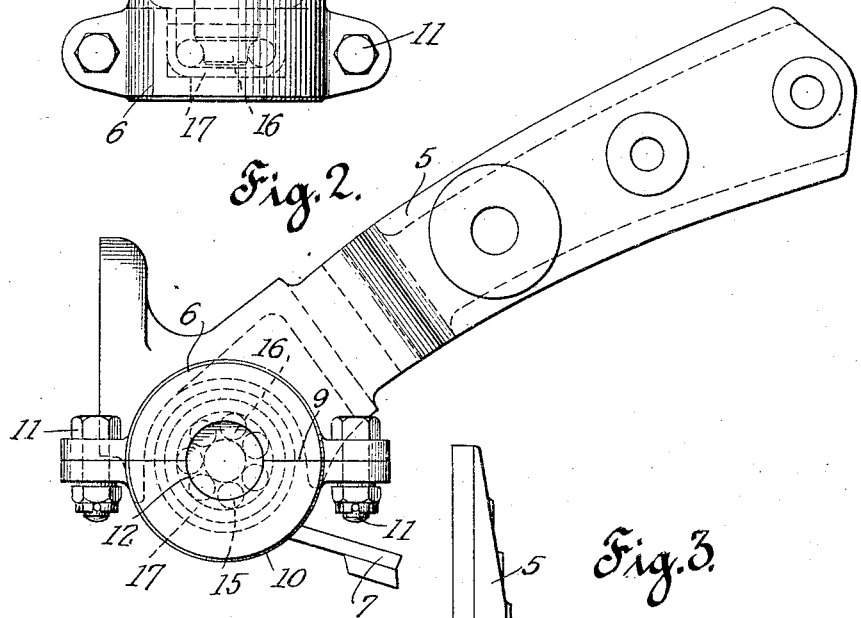
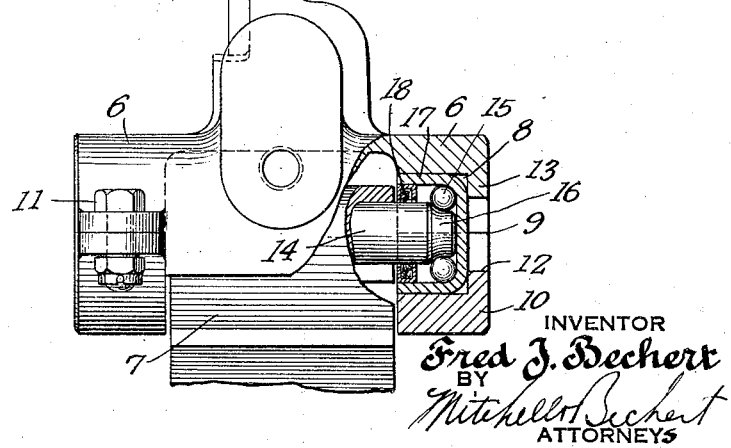
INVENTOR
Fred J. Bechert
BY
Mitchell Bechert
ATTORNEYS Patented Feb. 7, 1933

1,896,878

UNITED STATES PATENT OFFICE

FRED J. BECHERT, OF STAMFORD, CONNECTICUT, ASSIGNOR TO THE FAFNIR BEARING COMPANY, OF NEW BRITAIN, CONNECTICUT, A CORPORATION OF CONNECTICUT

SPRING END CONNECTION

Application filed November 3, 1928. Serial No. 316,908.

My invention relates to an antifriction bearing spring connection for connecting the spring and frame of a motor vehicle.

Among the objects of my invention are to provide an antifriction spring connection, which will facilitate assembly and disassembly of parts; which is simple of construction, cheap to manufacture, and which may be readily assembled and disassembled by relatively unskilled persons.

Briefly stated, in the preferred form of the invention I provide a frame member having spaced apart aligned sockets or housing for antifriction bearings. These housings are divided transversely and preferably along a diametrical plane of the circular sockets. The other member to be connected to the frame member and usually the spring is provided with antifriction bearing raceway means to be supported by the antifriction bearing members in the spaced apart housings. The divided housing parts are suitably held together as by means of bolts, and when the housing parts are separated the frame and spring may be readily separated from each other.

In the drawing which shows, for illustrative purposes only, a preferred form of the invention—

Fig. 1 is a top plan view of a spring connection illustrative of the invention;

Fig. 2 is a side view in elevation of the parts shown in Fig. 1;

Fig. 3 is an end view in partial section of the parts shown in Figs. 1 and 2.

In said drawing, 5 indicates what may be termed a frame member, which will ordinarily be rigidly secured to the main frame of a motor vehicle. It is to be understood, however, that this frame member could be secured directly to the spring. The frame member 5 is provided with rigid and preferably integral bosses 6—6 spaced apart from each other a distance sufficient to loosely accommodate the width of the spring 7. The bearing bosses 6 are provided with aligned preferably circular recesses as 8 for the accommodation of antifriction bearings, as will be described. The bosses 6—6 are divided transversely preferably along diametrical planes of the circular recesses 8 as indicated by the dividing line 9. The bearing recesses 8—8 are formed preferably half in the integral portions of the bosses 6—6 and half in what in effect are bearing retaining caps 10—10, which may be secured to the integral portions of the bosses 6—6 by any suitable means such as the bolts 11—11. In the particular form illustrated, the end walls of the bosses 6—6 are provided with openings 12—12, so as to facilitate the machining of the internal surfaces of the bearings recesses 8—8. The openings 12 are of a diameter less than the diameter of the recess 8, so that circumferential lips as 13 are left on the integral portions of the bosses 6—6 as well as upon the cap members 10—10.

The spring 7 is provided with bearing supporting means such as a pin member 14 rigidly secured to the spring and extending from opposite sides thereof. Interposed between the antifriction bearing support 14 and the bearing housings are antifriction bearing members such as balls 15—15. In the particular form illustrated, the pin 14 is provided at opposite ends with integrally formed bearing raceways 16—16, and the coacting raceway, in this case the outer raceway, is formed in a closed cup 17, which fits within the bearing housing 8. Suitable means such as a dust ring 18 serves to exclude dust from the bearings and to house lubricant. It will be seen that the raceways on the pin 14 and bearing cups 17 are inclined whereby the antifriction bearing members such as the balls 15 take both radial and end thrusts, and the entire weight transmitted through the frame 5 is carried by the balls themselves, and, since the pin 14 is rigidly secured to the spring 7, any end play is also taken by the antifriction bearing members, and there are substantially no rubbing surfaces to wear and cause squeaks.

In the manufacture of the present spring connection, it is desirable to space the raceways 16—16 a definite distance apart, and to likewise space the bearing raceway members 17—17 a definite distance apart, so that when the parts are assembled, the antifriction bearing members 15 will have just the desired fit on the raceways. Thus, all parts will be freely interchangeable, and there are no adjustments to be made, and after the parts have been once accurately manufactured, nothing is left to the skill of the particular mechanic assembling the spring connection, and a perfect fit is assured.

One of the principal advantages of the present invention lies in the ease of assembly and disassembly of the spring connection. In assembling, the antifriction bearings including the antifriction bearing members 15 and the bearing raceway members 17, may be assembled directly upon the pins 14 or other means employed, and then this subassembly of the spring and antifriction bearings complete is moved transversely into the position shown in the drawing; that is, the bearing raceway members 17—17 are fitted into the half bearings in the upper portion of the bosses 6—6. Thereafter, the remaining portions of the bosses in the form of retaining caps 10—10 are put in place and held by means such as the simple bolts 11—11. Disassembly of the spring connection is very simple, in that the retaining caps 10—10 may be removed and the parts carried by the spring and frame separated.

It is also to be noted that very little fine machining or finishing need be done on the bearing bosses 6, since these bosses merely serve as retaining members for the antifriction bearings. With an accurate casting or a forging (when forgings are used), little or no machining will be required in the bore of the bearing housing 8—8. If the retaining lips 13—13, which determine the positioning in the present instance of the bearing members 17—17, are not the exact required distance apart, some machining may be necessary for properly spacing these retaining walls.

It will be seen that I have provided a very simple and readily manufactured spring connection, which will greatly facilitate assembly and disassembly, and a construction which is non-adjustable so as to render all parts readily interchangeable.

In the particular embodiment illustrated, a frame member 5 is secured to the main frame of a vehicle, while the antifriction bearing raceway member 14 is carried by the spring. Obviously, the frame 5 could be carried by the spring and the pin or equivalent device 14 carried by the frame. In certain types of springs, such as so-called cantilever springs, one end of the spring is attached to the vehicle axle and not to the main frame of the vehicle. I therefore wish to use the term "frame" in a broad sense to include such use of the present invention, since obviously the invention is not dependent upon securing the end of the spring to the main frame of the vehicle.

While the invention has been described in considerable detail, I do not wish to be strictly limited to the form shown, since changes may be made within the scope of the invention as defined within the appended claim.

I claim:

In a spring connection, a frame member having spaced apart bosses thereon, each of said bosses having a half bearing recess for receiving a bearing raceway, cover cap means secured to said bosses and having half bearing recesses complementary to the first mentioned bearing recesses, a bearing raceway held between each pair of complementary recesses, bearing raceway means interposed between said first mentioned raceways, antifriction bearing members interposed between each pair of complementary raceways, and means at the outer ends of each of said bearing recesses including means carried by said bosses and said cover cap means for supporting the raceways in said recesses against outward displacement.

FRED J. BECHERT.